United States Patent
Yarbrough

(10) Patent No.: US 10,519,928 B2
(45) Date of Patent: Dec. 31, 2019

(54) SHEAR WEB FOR A WIND TURBINE ROTOR BLADE

(71) Applicant: General Electric Company, Schenectady, NY (US)

(72) Inventor: Aaron A. Yarbrough, Greenville, SC (US)

(73) Assignee: General Electric Company, Schenectady, NY (US)

( * ) Notice: Subject to any disclaimer, the term of this patent is extended or adjusted under 35 U.S.C. 154(b) by 230 days.

(21) Appl. No.: 15/617,192

(22) Filed: Jun. 8, 2017

(65) Prior Publication Data
US 2018/0355843 A1    Dec. 13, 2018

(51) Int. Cl.
F03D 1/06 (2006.01)

(52) U.S. Cl.
CPC .......... *F03D 1/0683* (2013.01); *F03D 1/065* (2013.01); *F03D 1/0675* (2013.01); *F05B 2240/302* (2013.01)

(58) Field of Classification Search
CPC ...... F03D 1/0683; F03D 1/065; F03D 1/0675; F05B 2240/302
See application file for complete search history.

(56) References Cited

U.S. PATENT DOCUMENTS

| | | | |
|---|---|---|---|
| 8,075,275 B2 | 12/2011 | Althoff et al. | |
| 8,235,671 B2 | 8/2012 | Yarbrough | |
| 8,257,048 B2 | 9/2012 | Yarbrough | |
| 8,262,362 B2 | 9/2012 | Yarbrough | |
| 9,458,823 B2 | 10/2016 | Liu | |
| 2011/0103962 A1* | 5/2011 | Hayden | F03D 1/0675 416/226 |
| 2011/0142669 A1 | 6/2011 | Althoff et al. | |
| 2011/0142674 A1* | 6/2011 | Dixon | F03D 1/0675 416/241 R |
| 2011/0223032 A1* | 9/2011 | Tobin | B29D 99/0025 416/229 R |
| 2013/0216388 A1 | 8/2013 | Akhtar et al. | |

OTHER PUBLICATIONS

Ruffner, Benjamin F., and Calvin L. Schmidt. Stresses at Cut-Outs in Shear Resistant Webs. National Advisory Committee for Aeronautics, Oct. 1945, ntrs.nasa.gov/archive/nasa/casi.ntrs.nasa.gov/19930087871.pdf. (Year: 1945).*

* cited by examiner

*Primary Examiner* — Kevin A Lathers
(74) *Attorney, Agent, or Firm* — Dority & Manning, P.A.

(57) ABSTRACT

A rotor blade for a wind turbine includes an upper shell member having a spar cap configured on an internal face thereof, a lower shell member having a spar cap configured on an internal face thereof, and a shear web assembly extending between the spar caps along a longitudinal length of the rotor blade. The shear web assembly includes, at least, a first shear web and a second shear web. The first shear web starts at a blade root of the rotor blade and extends to an intermediate span location. The second shear web overlaps the first shear web at the intermediate span location and extends towards a blade tip of the rotor blade so as to provide increase torsional rigidity to the rotor blade.

19 Claims, 8 Drawing Sheets

SHEAR WEB FOR A WIND TURBINE ROTOR BLADE

FIELD

The present invention relates generally to the field of wind turbines, and more particularly to shear web configurations within wind turbine rotor blades.

BACKGROUND

Wind power is considered one of the cleanest, most environmentally friendly energy sources presently available, and wind turbines have gained increased attention in this regard. A modern wind turbine typically includes a tower, a generator, a gearbox, a nacelle, and a rotor including one or more rotor blades. The rotor blades capture kinetic energy from wind using known airfoil principles and transmit the kinetic energy through rotational energy to turn a shaft coupling the rotor blades to a gearbox, or if a gearbox is not used, directly to the generator. The generator then converts the mechanical energy to electrical energy that may be deployed to a utility grid.

The rotor blades are the primary elements for converting wind energy into electrical energy. Further, the rotor blades have the cross-sectional profile of an airfoil such that, during operation, air flows over the blade producing a pressure difference between the sides. Consequently, a lift force, which is directed from a pressure side towards a suction side, acts on the blade. The lift force generates torque on the main rotor shaft, which is geared to a generator for producing electricity.

Conventional rotor blades typically include a suction side shell and a pressure side shell that are bonded together at bond lines along the trailing and leading edges of the blade. An internal shear web extends between the pressure and suction side shell members and is bonded to spar caps affixed to the inner faces of the shell members. A typical wind blade includes a single web design which promotes torsional rigidity. Skin plies on the outer periphery of the airfoil also aid in increasing torsional rigidity. The shear web(s) may also promote stability of the flanges of the I-beam configuration of a spar cap system.

Additionally, the rotor blade can experience increased twist when the chord and thickness of the airfoil are reduced and the torsional stiffness of the blade starts dropping quickly. Such events typically start at an outboard location of the rotor blade, e.g. starting at about 50% span. Further, the blade tip generally experiences the greatest amount of twist, thereby changing the angle of attack in the wind, which can impact the energy capture of the rotor blade.

Accordingly, the industry would benefit from an improved rotor blade having an increased torsional stiffness without unduly increasing the weight thereof.

BRIEF DESCRIPTION

Aspects and advantages of the invention will be set forth in part in the following description, or may be obvious from the description, or may be learned through practice of the invention.

In one aspect, the present disclosure is directed a rotor blade for a wind turbine. The rotor blade includes an upper shell member having a spar cap configured on an internal face thereof, a lower shell member having a spar cap configured on an internal face thereof, and a shear web assembly extending between the spar caps along a longitudinal length of the rotor blade. The shear web assembly includes, at least, a first shear web and a second shear web. The first shear web starts at or near a blade root of the rotor blade and extends to an intermediate span location. The second shear web overlaps the first shear web at the intermediate span location and extends towards a blade tip of the rotor blade so as to provide increase torsional rigidity to the rotor blade. In addition, the dual shear web changes the shear-center of the cross-section of the rotor blade, which impacts how the rotor blade bends and twists simultaneously.

In one embodiment, the shear web assembly further includes a third shear web overlapping the first shear web at the intermediate span location. In such embodiments, the second and third shear webs overlap opposing sides of the first shear web. In another embodiment, the first, second, and third shear webs may be equally spaced apart in a chord-wise direction of the rotor blade.

In another embodiment, the first shear web may be longer than the second shear web. In additional embodiments, the intermediate span location may be located from about 40% span to about 60% span of the rotor blade. In further embodiments, the first, second, and/or third shear webs may include one or more cut-outs configured to provide stress relief to the respective shear web.

In yet another embodiment, the shear web assembly may further include an additional shear web at a different chord location than the first and second shear webs.

In another aspect, the present disclosure is directed to a rotor blade for a wind turbine. The rotor blade includes an upper shell member having a spar cap configured on an internal face thereof, a lower shell member having a spar cap configured on an internal face thereof, and a shear web assembly extending between the spar caps along a longitudinal length of the rotor blade. The shear web assembly includes, at least, a first shear web and a second shear web. More specifically, the first shear web starts near a blade root of the rotor blade and extends toward a blade tip of the rotor blade, whereas the second shear web overlaps the first shear web at an intermediate span location. It should be further understood that the rotor blade may further include any of the additional features as described herein.

In yet another aspect, the present disclosure is directed to a method for manufacturing a rotor blade having increased torsional rigidity. The method includes providing upper and lower shell members with spar caps configured on a respective internal faces thereof. Another step includes placing a first shear web along a span of the rotor blade from a blade root towards a blade tip thereof between the spar caps. The method further includes placing a second shear web along the span of the rotor blade such that a portion of the second shear web overlaps the first shear web at an intermediate span location. In addition, the method includes joining the upper and lower shell members.

In one embodiment, the method may include determining the intermediate span location as a function of a desired twist of the rotor blade. In another embodiment, the method may include determining the desired twist of the rotor blade as a function of one or more wind conditions at a site of the wind turbine. It should be further understood that the method may further include any of the additional features and/or steps as described herein.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art is set forth in the specification, which makes reference to the appended figures, in which.

DETAILED DESCRIPTION

Figure 1:
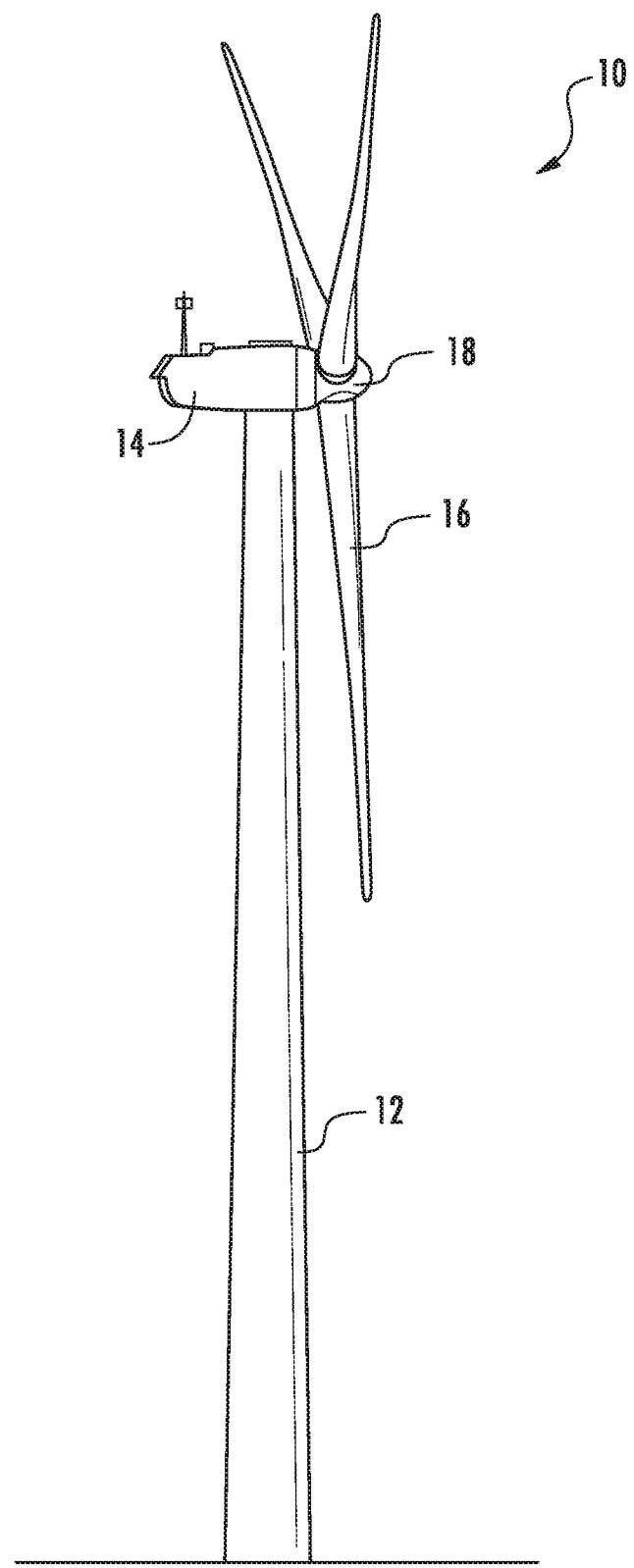
FIG. 1 illustrates a perspective view of one embodiment of a wind turbine according to the present disclosure.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention include such modifications and variations as come within the scope of the appended claims and their equivalents.

Referring now to the drawings, FIG. 1 illustrates a wind turbine 10 according to the present disclosure. As shown, the wind turbine 10 includes a tower 12 with a nacelle 14 mounted thereon. A plurality of turbine blades 16 are mounted to a rotor hub 18, which is in turn connected to a main flange that turns a main rotor shaft. The wind turbine power generation and control components are housed within the nacelle 14. The view of FIG. 1 is provided for illustrative purposes only to place the present invention in an exemplary field of use. It should be appreciated that the invention is not limited to any particular type of wind turbine configuration.

Figure 2:
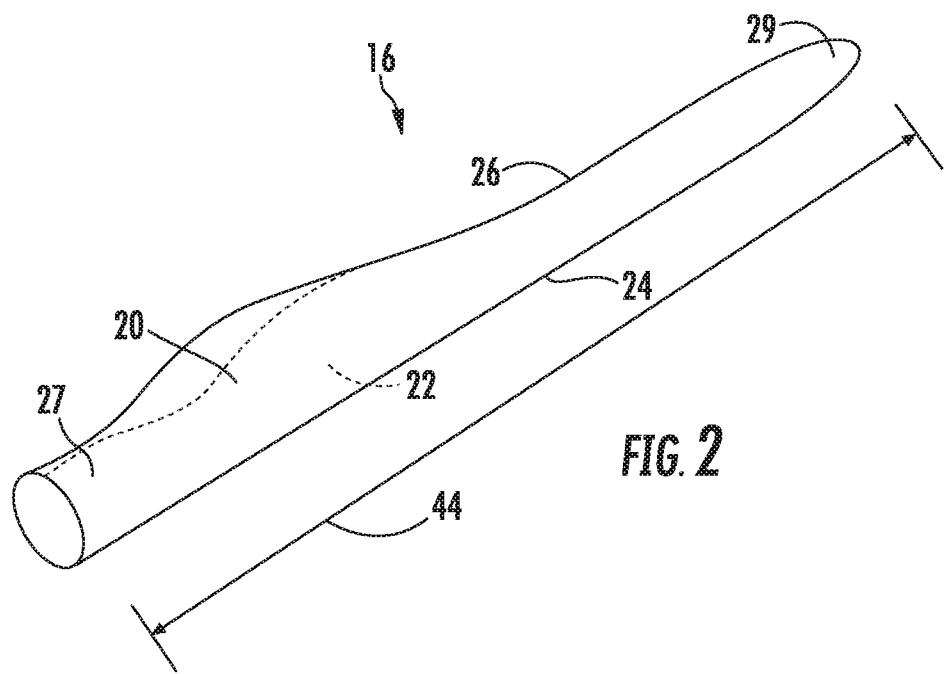
FIG. 2 illustrates a perspective view of one embodiment of a rotor blade of a wind turbine according to the present disclosure.

Referring now to FIG. 2, a more detailed, perspective view of one of the rotor blades 16 of FIG. 1 is illustrated. As shown, the rotor blade 16 includes an upper shell member 20 and a lower shell member 22. The upper shell member 20 may be configured as the suction side surface of the blade 16, while the lower shell member 22 may be configured as the pressure side surface of the blade. The blade 16 includes a leading edge 24 and a trailing edge 26, as well as a root portion 28, and a tip portion 30. As is well known in the art, the upper shell member 20, and lower shell member 22 are joined together at the leading edge 24 and trailing edge 26.

Figure 3:
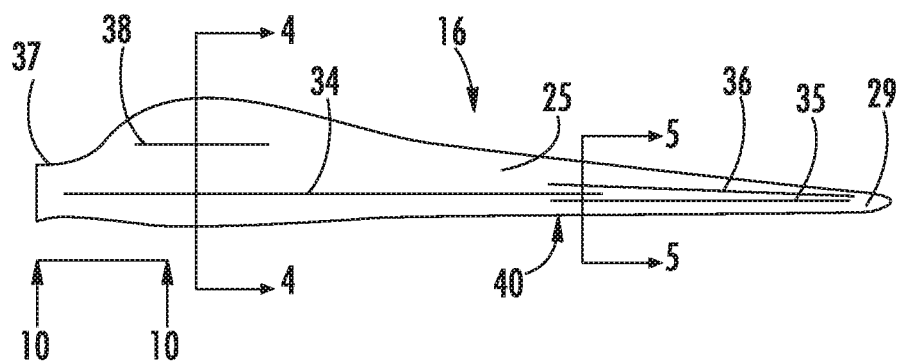
FIG. 3 illustrates a top view of one embodiment of a rotor blade of a wind turbine, particularly illustrating a shear web assembly configured therein according to the present disclosure.
Figure 4:
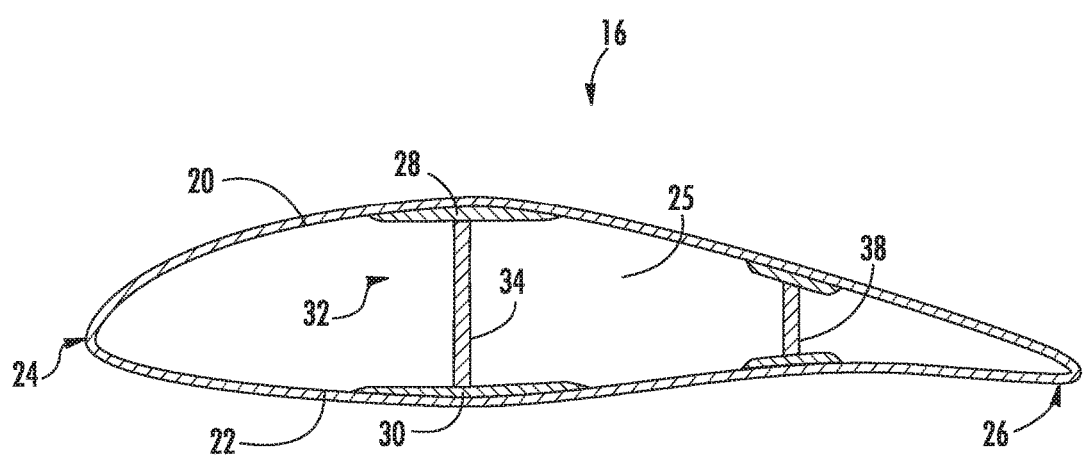
FIG. 4 illustrates a cross-sectional view of the rotor blade of FIG. 3 along line 4-4.
Figure 5:
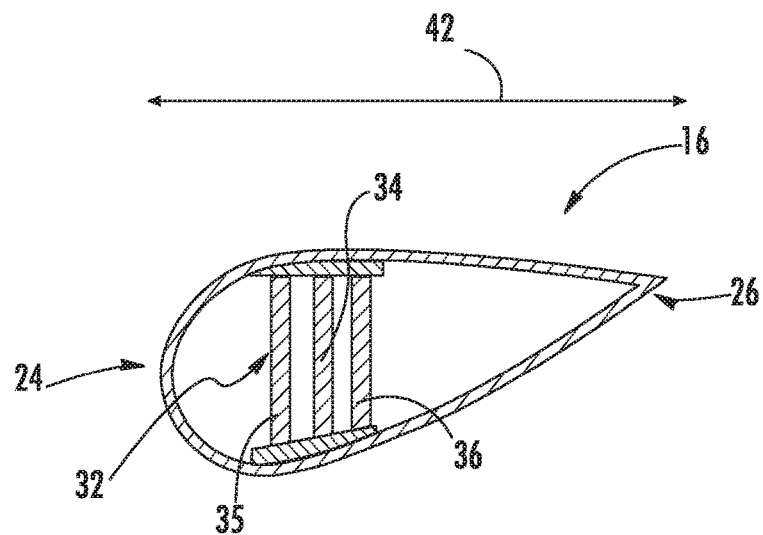
FIG. 5 illustrates a cross-sectional view of the rotor blade of FIG. 3 along line 5-5.

Referring now to FIG. 3, the rotor blade 16 includes an internal cavity 25 in which various structural members, such as spar caps and one or more shear webs, are configured. For example, FIGS. 4 and 5 illustrate cross-sectional views of the rotor blade 16 of FIG. 3 along lines 4-4 and 5-5, respectively. As shown, the rotor blade 16 includes a shear web assembly 32 having one or more internal structural shear webs 34, 35, 36, 38 that span between the upper and lower shell members 20, 22. In particular, as shown, the shear web assembly 32 spans between structural spar caps 28, 30 that are fixed to the internal faces of the shell members 20, 22. Further, as will be described herein, the shear web assembly 32 of the present disclosure provides an optimal design configuration of a wind turbine blade based on performance of the tip twisting under design loads. Further, the shear web assembly 32 provides a low-weight approach while optimizing the performance benefit. In other words, the shear web assembly 32 improves the performance of the rotor blade 16 near the blade tip 29 where improvement is needed while also keeping cost incurred to a minimum.

Referring particularly to FIGS. 3-9, various embodiments of the partial dual shear web assembly 32 according to the present disclosure are illustrated. The dual web design is inherently stiffer in torsion than a single web design because it short circuits a shear flow path along the outer periphery of the airfoil and keeps a majority of the internal shear flow in the box formed by the webs and the spars. However, as mentioned, the dual-shear web configuration only extends a portion of the span 44 of the rotor blade 16 to minimize mass/weight associated with the extra webs.

Figure 6:
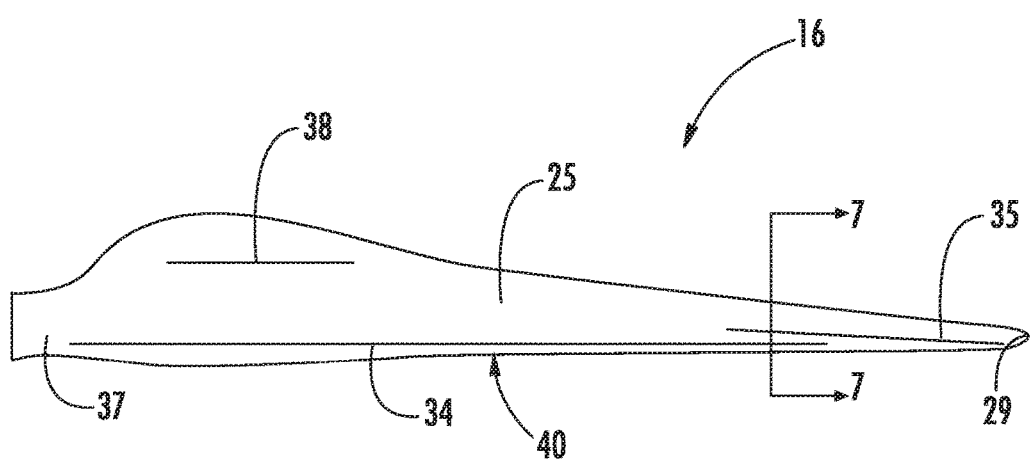
FIG. 6 illustrates a top view of another embodiment of a rotor blade of a wind turbine, particularly illustrating a shear web assembly configured therein according to the present disclosure.

More specifically, as shown, the shear web assembly 32 includes, at least, a first shear web 34 and a second shear web 35. Further, as shown in FIGS. 3 and 6, the first shear web 34 starts or begins at or near the blade root 27 of the rotor blade 16 and extends to an intermediate span location 40, i.e. before the blade tip 29. Thus, the second shear web 34 overlaps the first shear web 34 at the intermediate span location 40 and extends towards the blade tip 30 of the rotor blade 16 to provide additional strength at the tip 29. For example, as shown in the illustrated embodiments, the intermediate span location 40 is generally located from about 40% span to about 60% span of the rotor blade 16, which generally corresponds to the location in the rotor blade 16 where the chord and thickness of the airfoil are reduced and the torsional stiffness of the rotor blade 16 starts to drop.

Figure 8:
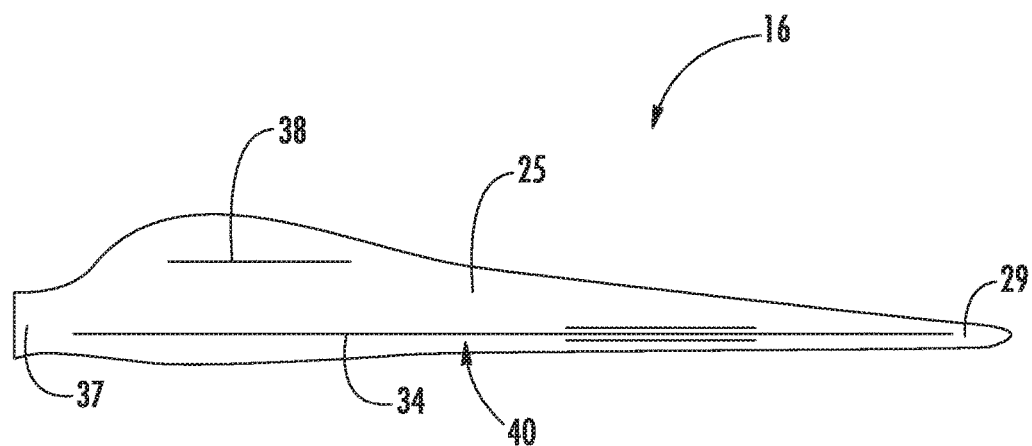
FIG. 8 illustrates a top view of another embodiment of a rotor blade of a wind turbine, particularly illustrating a shear web assembly configured therein according to the present disclosure.
Figure 9:
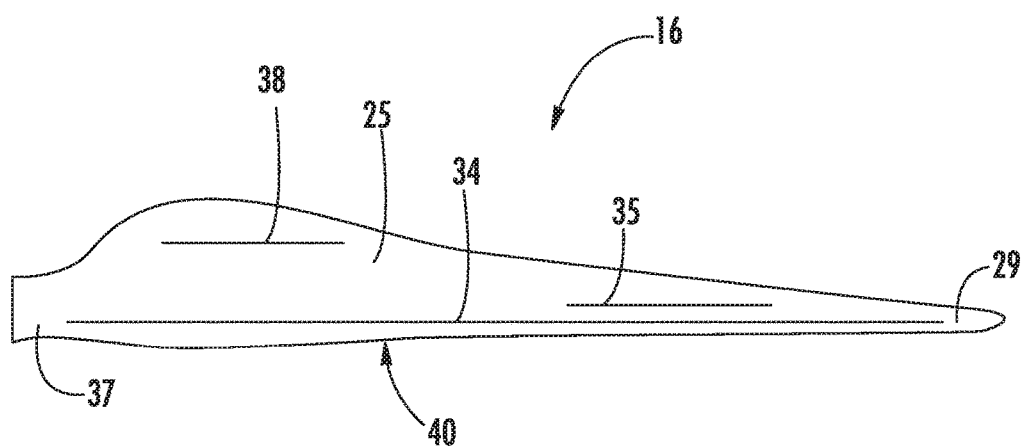
FIG. 9 illustrates a top view of another embodiment of a rotor blade of a wind turbine, particularly illustrating a shear web assembly configured therein according to the present disclosure.

Alternatively, as shown in FIGS. 8 and 9, the first shear web 34 may start at or near the blade root 27 of the rotor blade 16 and extend up to the blade tip 29. In such embodiments, the second shear web 34 overlaps the first shear web 34 at an intermediate span location 40; however, the first shear web 34 extends beyond the second shear web 35 and continues past the intermediate span location 40 towards the blade tip 29.

Referring particularly to FIGS. 3, 5, and 8, the shear web assembly 32 may also include a third shear web 36 that overlaps the first shear web 34 at the intermediate span location 40. In such embodiments, as shown, the second and third shear webs 35, 36 overlap opposing sides of the first shear web 34. As such, the shear webs 34, 35, 36 may be arranged with any suitable spacing therebetween. For example, in one embodiment, the first, second, and third shear webs 34, 35, 36 may be equally spaced in a chord-wise direction (i.e. in the direction of the chord 42) of the rotor blade 16.

Figure 7:
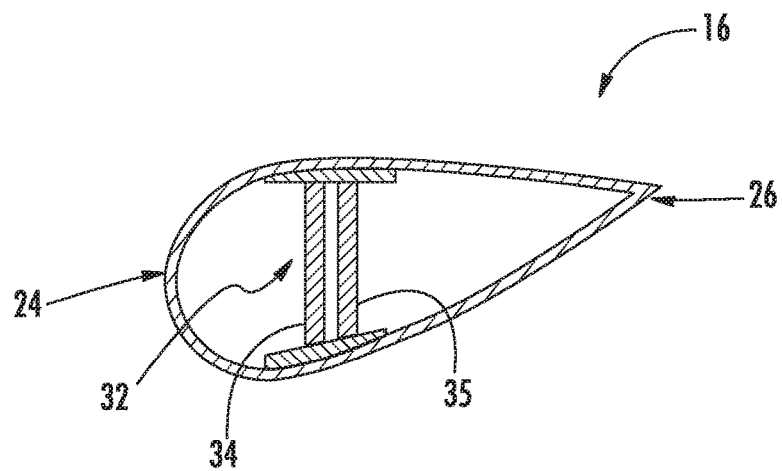
FIG. 7 illustrates a cross-sectional view of the rotor blade of FIG. 6 along line 7-7.

Alternatively, as shown in FIGS. 6, 7, and 9, the third shear web 36 may be absent such that only the second shear web 35 forms the overlap. More specifically, as shown in FIGS. 6 and 7, the second shear web 35 overlaps the first shear web 34 at the intermediate span location 40, at which point the first shear web 34 ends and the second shear web 35 continues to the blade tip 29. Alternatively, as shown in FIG. 9, the second shear web 35 overlaps the first shear web 34 at the intermediate span location 40, at which point the second shear web 35 ends and the first shear web 34 continues to the blade tip 29.

In additional embodiments, as shown in FIGS. 3, 6, 7, and 8, the first shear web 34 may be longer than the second shear web 35 (and/or the third shear web 36). As such, the first shear web 34 is configured to extend to the desired span location (e.g. the intermediate span location 40) to provide a rotor blade 16 having increase torsional stiffness and reduced weight. In other words, the dual-shear web configuration is limited to the portion of the rotor blade 16 that experiences higher twist.

Figure 10:
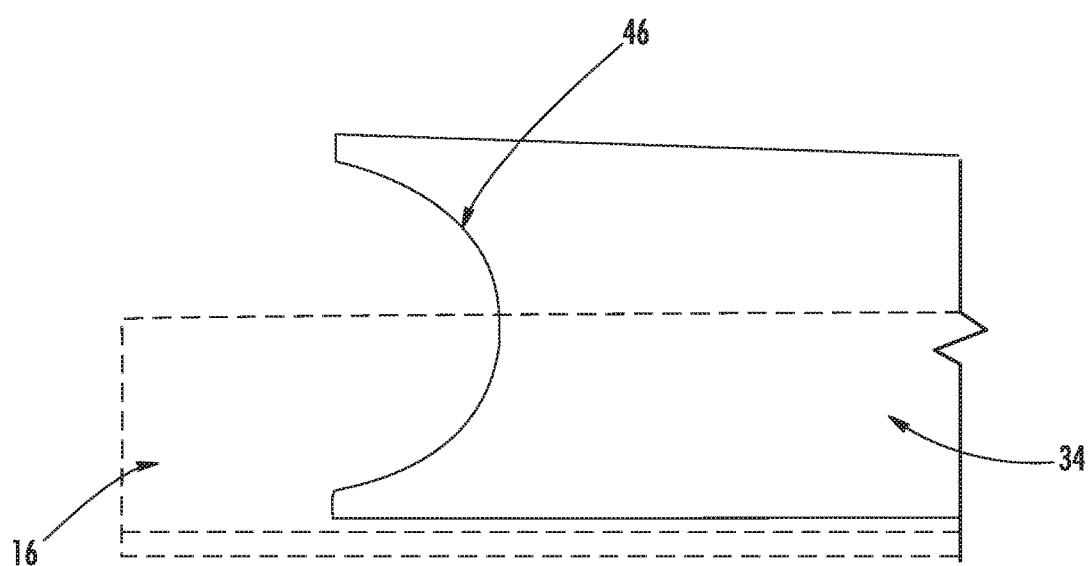
FIG. 10 illustrates a cross-sectional view of the rotor blade of FIG. 3 along line 10-10.

Referring now to FIG. 10, in further embodiments, the first, second, and/or third shear webs 34, 35, 36 may include one or more cut-outs 46 configured to provide stress relief to the respective shear web. More specifically, the desired stress relief may be synonymous with the peel stress (i.e. a combination of tensile and shear stresses) which acts to pry two elements apart. As such, by providing the cut-out 46, the local stiffness of the shear web 34 is reduced which in turn reduces the amount of tensile forces that develop across the web height direction. The shear load in the shear web 34 is also configured to drop near the termination and the peel stress is consequently reduced. In addition, as shown, the cut-outs 46 may have a semi-circular shape. It should be further understood that the cut-outs 46 may have any other suitable shape as well to provide the desired stress relief. For example, in one embodiment, the cut-out 46 may have a parabolic shape across the height direction. Further, the cut-out 46 may be located at the root 27 and/or the tip 29 or just on one side.

Referring back to FIGS. 3 and 4, the shear web assembly 32 may further include an additional shear web 38 at a different chord location than the first shear web 34. For example, as shown, the additional shear web 38 may be shorter than the first shear web 34 and may be configured closer to the trailing edge 26 of the rotor blade 16.

Figure 11:
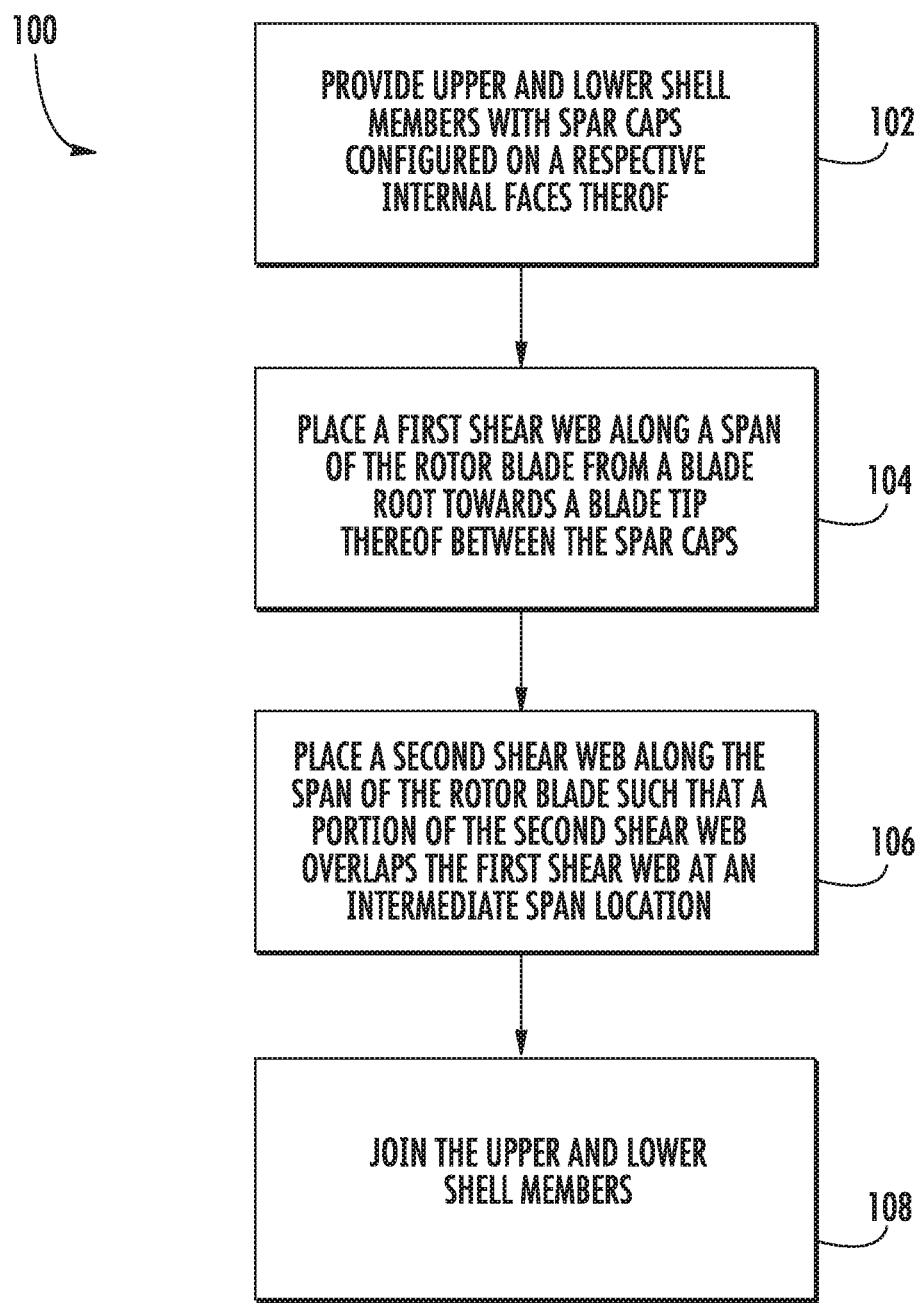
FIG. 11 illustrates a flow diagram of one embodiment of manufacturing a rotor blade according to the present disclosure.

Referring now to FIG. 11, a flow diagram of one embodiment of a method 100 for manufacturing a rotor blade 16 of a wind turbine 10 having increased torsional rigidity is illustrated. As shown at 102, the method 100 includes providing upper and lower shell members 20, 22 with spar caps 28, 30 configured on respective internal faces thereof. As shown at 104, the method 100 includes placing a first shear web 34 along the span 44 of the rotor blade 16 from near the blade root 27 towards a blade tip 29 thereof between the spar caps. As shown at 106, the method 100 includes placing a second shear web 35 along the span 44 of the rotor blade 16 such that a portion of the second shear web 35 overlaps the first shear web 34 at the intermediate span location 40. As shown at 106, the method 100 includes joining the upper and lower shell members 20, 22.

In one embodiment, the method 100 may include determining the intermediate span location 40 as a function of a desired twist of the rotor blade 16. In another embodiment, the method 100 may include determining the desired twist of the rotor blade 16 as a function of one or more wind conditions at a site of the wind turbine 10. In other words, the intermediate span location 40 can be easily changed to accommodate varying wind conditions at different wind turbine site locations.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A rotor blade for a wind turbine, the rotor blade comprising:
   an upper shell member having a spar cap configured on an internal face thereof;
   a lower shell member having a spar cap configured on an internal face thereof; and,
   a shear web assembly extending between the spar caps along a span of the rotor blade, the shear web assembly comprising, at least, a first shear web and a second shear web, the first shear web starting at a blade root of the rotor blade and extending to a first intermediate span location, the second shear web starting at a second intermediate span location, the second intermediate span location being closer to the blade root than the first intermediate span location, the second shear web overlapping the first shear web between the first and second intermediate span locations and extending towards a blade tip of the rotor blade.

2. The rotor blade of claim 1, wherein the shear web assembly further comprises a third shear web overlapping the first shear web.

3. The rotor blade of claim 2, wherein the second and third shear webs overlap opposing sides of the first shear web.

4. The rotor blade of claim 3, wherein the first, second, and third shear webs are equally spaced in a chord-wise direction of the rotor blade.

5. The rotor blade of claim 1, wherein the first shear web is longer than the second shear web.

6. The rotor blade of claim 1, wherein the first and second shear web overlap at a location from about 40% span to about 60% span of the rotor blade.

7. The rotor blade of claim 1, wherein at least one of the first shear web, the second shear web, or the third shear web comprises one or more cut-outs configured to provide stress relief to the respective shear web.

8. The rotor blade of claim 1, wherein the shear web assembly further comprises an additional shear web at a different chord location than the first and second shear webs.

9. A rotor blade for a wind turbine, the rotor blade comprising:
an upper shell member having a spar cap configured on an internal face thereof;
a lower shell member having a spar cap configured on an internal face thereof; and,
a shear web assembly extending between the spar caps along a span of the rotor blade, the shear web assembly comprising, at least, a first shear web and a second shear web, the first shear web starting at a blade root of the rotor blade and extending toward a blade tip of the rotor blade to a first intermediate span location, the second shear web starting at a second intermediate span location, the second intermediate span location being closer to the blade root than the first intermediate span location, the second shear web overlapping the first shear web between the first and second intermediate span locations.

10. The rotor blade of claim 9, wherein the shear web assembly further comprises a third shear web overlapping the first shear web.

11. The rotor blade of claim 10, wherein the second and third shear webs overlap opposing sides of the first shear web.

12. The rotor blade of claim 10, wherein the first, second, and third shear webs are equally spaced in a chord-wise direction of the rotor blade.

13. The rotor blade of claim 9, wherein the first shear web is longer than the second shear web.

14. The rotor blade of claim 9, wherein the first and second shear web overlap at a location from about 40% span to about 60% span of the rotor blade.

15. The rotor blade of claim 9, wherein at least one of the first shear web, the second shear web, or the third shear web comprises one or more cut-outs configured to provide stress relief to the respective shear web.

16. The rotor blade of claim 9, wherein the shear web assembly further comprises an additional shear web at a different chord location than the first and second shear webs.

17. A method for manufacturing a rotor blade having increased torsional rigidity, the method comprising:
providing upper and lower shell members with spar caps configured on respective internal faces thereof;
placing a first shear web along a span of the rotor blade from a blade root towards a blade tip thereof between the spar caps to a first intermediate span location;
placing a second shear web along the span of the rotor blade starting at a second intermediate span location, the second intermediate span location being closer to the blade root than the first intermediate span location such that a portion of the second shear web overlaps the first shear web between the first and second intermediate span locations; and,
joining the upper and lower shell members.

18. The method of claim 17, further comprising determining a location of the portion of overlap between the first and second shear webs as a function of a desired twist of the rotor blade.

19. The method of claim 18, further comprising determining the desired twist of the rotor blade as a function of one or more wind conditions at a site of the wind turbine.

* * * * *